United States Patent [19]

Straka

[11] 4,263,362
[45] Apr. 21, 1981

[54] COATING COMPOSITION FOR GLASS FIBERS AND COATED GLASS FIBERS MADE FROM SAME

[75] Inventor: Daniel C. Straka, Sewickley, Pa.

[73] Assignee: PPG Industries, Inc., Pittsburgh, Pa.

[21] Appl. No.: 96,956

[22] Filed: Nov. 23, 1979

[51] Int. Cl.$^3$ .............................................. B32B 7/00
[52] U.S. Cl. ........................................ 428/258; 34/95;
139/383 A; 252/8.6; 252/8.8; 260/28.5 B;
260/29.7 H; 260/29.7 E; 260/29.7 N; 260/29.7
NE; 427/389.8; 428/259; 428/268; 428/273;
428/365
[58] Field of Search ............... 428/268, 273, 392, 375,
428/378, 394, 258, 259, 280, 365; 427/389.8;
260/28.5 B, 29.7 H, 29.7 E, 29.7 N, 29.7 NE;
252/8.6, 8.8; 34/95; 139/383 A

[56] References Cited

U.S. PATENT DOCUMENTS

| | | | |
|---|---|---|---|
| 3,091,019 | 5/1963 | Wetterau | 428/229 |
| 3,320,113 | 5/1967 | Nicholas et al. | 428/87 |
| 3,414,432 | 12/1968 | Metzweiller et al. | 428/441 |
| 3,414,458 | 12/1968 | Lacy | 428/98 |
| 3,424,608 | 1/1969 | Marzocchi et al. | 428/288 |
| 3,642,516 | 2/1972 | Gassaway et al. | 428/229 |
| 3,728,146 | 4/1973 | Marzocchi et al. | 428/378 |
| 3,741,854 | 6/1973 | DeGoria | 428/95 |
| 3,787,224 | 1/1974 | Uffner | 428/268 |
| 3,827,230 | 8/1974 | Marzocchi et al. | 428/295 |
| 3,864,195 | 2/1975 | Patterson | 428/94 |
| 4,060,658 | 11/1977 | Lim et al. | 428/378 |
| 4,147,833 | 4/1979 | Ellerman et al. | 428/378 |
| 4,164,485 | 8/1979 | Gorgis | 428/378 |

Primary Examiner—James J. Bell
Attorney, Agent, or Firm—Kenneth J. Stachel

[57] ABSTRACT

A coating composition for producing coated glass fiber strands and the coated glass fiber strands are provided, where the coated strands have good knot tensile strength and improved processability. The coating composition has a carboxylated elastomeric latex, an elastomeric plasticizer, a hydrophilic/lipophilic agent, an antioxidant, wax emulsion, anti-foaming agent, tertiary amine, polyhydroxylated glycol, and a pH in the range of about 8.7 to about 9.5. The coated glass fiber strand has the aforementioned coating in an amount of about 10 to about 20 (LOI) loss on ignition.

16 Claims, No Drawings

COATING COMPOSITION FOR GLASS FIBERS AND COATED GLASS FIBERS MADE FROM SAME

BACKGROUND OF THE INVENTION

The present invention is related to a coating composition and coated glass fibers made therefrom containing one or more elastomeric latices to produce coated glass fiber strand having good weaveability for use in woven carpets.

Until recently, jute fibers were used as the fill material for woven carpets, that is, the jute fibers were used as the weft to lock in the pile of the woven carpet. The jute fibers made good carpet fill materials because the fibers were quite strong and reasonably stable. Recently the availability of jute fibers has become a problem. This coupled with the recognition of the lack of uniformity of jute fibers, has led to an effort to replace jute fibers with other materials.

Materials that could be used to replace the jute fibers must be able to withstand the rigors of the weaving process. The weaving process that is performed in producing a woven carpet, involves weaving strands or fibers in along with the carpet pile material so that the carpet pile material constitutes the warp of the woven product while the strand constitutes the weft of the woven product. The weft of the textile fabric is woven generally perpendicularly into parallel strands coming off a beam which is supplied by a source usually mounted on an apparatus which weaves the weft yarn into the warp yarn.

This is in contrast to the production of tufted carpets wherein a woven synthetic carpet backing material is initially provided. Such a carpet backing material is composed of a woven fabric of flat synthetic strands having substantially uniform thickness and width. Suitable synthetic materials are penetrable by a tufting needle that are sufficiently strong to provide an adequate carpet backing. Preferred synthetic materials include polyolefins, and particularly preferred materials consist of polyethylene and polypropylene. These synthetic materials are fashioned into solid ribbons or strands by either direct extrusion into a desired width or thickness or by splitting of sheets of the material at a desired width. Optionally, the strands of the synthetic material may be fashioned to a width wider than the desired width. The wider strand may then be folded to provide either a "U" or a "Z" shaped cross-section. The strands of synthetic material yields a uniform sheet of woven fabric having a thickness equivalent to two strands at every point in the fabric. This form of construction automatically eliminates the irregularities and interstices which are inherent in conventional jute or burlap backing material. The strands are substantially flat and penetrable by a tufting needle, therefore, it is possible for the tufting machine to interlace substantially uniform and parallel rows of tufting yarn by poking the yarn through the woven sheet material. The woven backing material is fed into the tufting machine where the carpet yarn is stitched through the backing to produce loops of carpet yarn on the upper face of the backing.

Glass fibers that constitute continuous glass fibers as well as strands, yarns, cords, and fabrics formed therefrom, have been used to replace jute in the carpet industry, by using the glass fibers in the form of waste tire cord, or glass fiber strand composed of small diameter glass fibers. Glass fibers would make an excellent replacement for jute as fill material in woven carpets because of the uniformity, dimensional and heat stability and strength of the glass fibers. Such a replacement of jute by glass fiber strand would require the glass fiber strand to have good weaveability.

Weaveability is a characteristic that glass fiber strand must have to undergo satisfactorily the weaving process in producing woven carpet. The glass fiber strand would be wound around a cop inside a shuttle of a weaving loom. The shuttle is transported, or in the case of a shuttless loom the strand itself is transported back and forth across the loom so the strand unravels from the cop to supply the weft in between the warp strands of pile material running perpendicular to the weft strands. As the strands unravel, it is coiled to some degree due to its previously wound condition. The coiled strand is vulnerable to breakage from the force applied to it in being transported across the loom. To avoid breakage from this force, the strand should have a good knot tensile strength. The knot tensile strength as measured by the American Society of Testing Materials (ASTM) standard D-2256 measures the tensile strength of the strand when folded over itself in a knot. Generally, glass fiber strand composed of glass fibers having small diameters have better weaveability than strands composed of coarser glass fibers. The problem with this is that the strands composed of fine glass fibers are more expensive to produce.

In the past when using glass fibers in producing carpet backing for tufted carpets the glass fibers have been coated with materials such as vinyl plastisols and acrylic-acetate (U.S. Pat. No. 3,642,516, Gasaway et al). Also, carpet backing materials have had applied to them adhesives such as an aqueous dispersion of carboxylated styrene-butadiene latex compound modified with melamine formaldehyde resin additive (U.S. Pat. No. 3,864,195 and U.S. Pat. No. 3,741,854).

It has recently been suggested to use coarser glass fibers with a coating composition having an elastomeric latex and an external plasticizer to produce coated glass fiber strands with improved weaveability. The elastomeric latex is a butadiene styrene latex and carboxylated derivatives thereof and the external plasticizer is soluble or dispersible or emulsifiable into the latex but not incorporatable into the polymer backbone of the elastomer. Such an external plasticizer is a petroleum hydrocarbon processing oil.

It has recently been discovered that the use of a coating composition containing a petroleum hydrocarbon processing oil with glass fibers leads to several processing problems. These problems include difficulty in emulsifying the oil, production of smoke under conditions of elevated temperature, and build-up of coating material on pulleys and traversing equipment.

It is an object of the present invention to provide a coating composition and coated glass fiber strands having good weaveability and also having improved processibility.

SUMMARY OF THE INVENTION

The aforementioned object and other objects are accomplished by the use of a coating composition for glass fibers having a stabilized natural or synthetic elastomer having pendant acid groups such as carboxylic acid groups, and an elastomeric plasticizing agent, capable of internal plasticization, along with surfactants, emulsifiers, anti-oxidants, wetting agents, stabilizing agents, lubricants, solubilizing agents, antifoaming agents and dyes. The glass fibers coated with the coating composition have good weaveability and processability and the coated glass fibers find uses in woven carpets and drier belts like those used in the paper industry.

DETAILED DESCRIPTION OF THE INVENTION

The carboxylated elastomer used in the coating composition of the present invention can be any elastic substance such as natural rubber latex from the hevea tree and/or synthetic rubber or rubber like materials having pendant carboxyl groups. This also includes having carboxyl groups in terminal positions on the polymer backbone. Synthetic rubber includes rubber-like material such as chloroprene, butadiene, isoprene, and copolymers thereof with acrylonitrile, styrene, and isobutylene. Non-exclusive examples of the carboxylated elastomer include carboxylated butadiene-styrene copolymer latices, such as, "Dylex 1204" and/or "Dylex 553" latices manufactured by ARCO Polymers, Inc. or "Pliolite 480" a carboxylated butadiene-styrene latex having a solids content of 45% and marketed by Goodyear Rubber Company. Also, hot polymerized carboxylated styrene-butadiene latices and cold polymerized carboxylated styrene-butadiene latices, carboxylated reclaimed rubber dispersions, carboxylated butyl rubber dispersions and carboxylated ethylene-propylene-butadiene terpolymer rubber dispersions can be used. The preferred carboxylated elastomeric latex is the carboxylated butadiene styrene latex that is of a less conductive type such as the "Dylex 1204" latex. This latex is a styrene butadiene random copolymer with 75 weight percent styrene that has carboxyl groups attached pendantly to the polymer backbone. In the alternative, the carboxylated styrene-butadiene block copolymer can be used. In the random or block copolymer any known ratio of styrene to butadiene can be used. The amount of the carboxylated elastomeric latex used is generally in the range of about 30 to about 70 weight percent on a dry solids basis of the coating or about 10 to about 40 weight percent on an aqueous basis. If less than 15 or 30 weight percent, respectively, of the elastomeric latex is used, the coating will not give the required protection to the glass fiber strands to prevent or maintain at a minimum the interfiber abrasion of the glass fibers comprising the strand. If more than about 40 or 70 weight percent, respectively, of the carboxylated elastomeric latex is used, the user will not obtain the benefits and such use would be uneconomic.

In addition to the carboxylated elastomeric latex, a small amount of a non-carboxylated latex may be substituted for the carboxylated latex. Such non-carboxylated latex includes natural rubber latex which may be the crude rubber latex or the latex which contains added material, or which can be treated to alter the character of the rubber, for example, by degradation and/or by oxidation. Also, any non-carboxylated synthetic rubber may be substituted for a portion of the carboxylated elastomeric latex. The portion substituted may be as great as one half the amount of the carboxylated elastomeric latex. The carboxylated and non-carboxylated elastomeric latices may contain any desired accelerator, vulcanizer or stabilizer, dispersing agents or any other substance such as are commonly used in the rubber industry and found in commercial latices.

The elastomeric plasticizer is any diene-based polymer and copolymer that is compatible with the elastomeric latex and can function as an internal plasticizer of the elastomeric latex. Non-exclusive examples of these compounds include; polyisoprene, polybutadiene, polychloroprene like Neoprene latices, and copolymers containing these diene-based polymers. The preferred elastomeric plasticizer is a polybutadiene homopolymer. The amount of elastomeric plasticizer is in the range of about 30 to about 70 parts per hundred parts of diene-based polymer or about 1 to 15 weight percent based on the aqueous composition. One particular polybutadiene homopolymer found particularly suitable is the polybutadiene latex known as "Latex 6290" available from Goodyear Tire and Rubber Company. Other polybutadienes that can be used include Firestone 6803 and 272 and S-285 and polybutadienes available from General Tire and Rubber Company and Goodyear Tire and Rubber Company such as 8025; and 629 LPM, LPM 2374L respectively.

Also present in the composition for coating glass fiber strands is a hydrophilic-lipophilic agent that is compatible with the system and that is nonic and that has a suitable HLB ratio. Non-exclusive examples of the hydrophilic-lipophilic agent are octylphenoxypoly (ethyleneoxy)ethanol, and other phenoxypoly(ethyleneoxy)ethanols. The preferred hydrophilic-lipophilic agent is the octylphenoxypoly(ethyleneoxy)ethanol, available as "Igepal CA-630" from GAF Corporation Chemical Products. These hydrophilic-lipophilic agents have the capability of acting as a detergent, wetting agent, and emulsifier and water soluble surfactant. The amount of hydrophilic-lipophilic agent that is present is in the range of about 0.1 to 2 weight percent of the aqueous composition.

Since oxidation plays a role in changes that accompany extended aging of non-compounded elastomeric latices, an antioxidant is added to the elastomeric latex-containing composition. Non-exclusive examples of the antioxidants that can be used in the present invention include: diarylamine type antioxidants or stabilizers, 2,2,4-trimethyl-1,2-dihydroquinoline and polymer (Age Rite D); 6-ethoxy-2,2,4-trimethyl-1,2-dihydroquinoline and polymer (Santoflex AW); 6-phenol-2,2,4-trimethyl-1,2-dihydroquinoline and polymer (Santoflex B); p-benzyloxyphenol (Age Rite Alba); di-tert-butyl-para-cresol (Ionol); 2,2'-methylenbis(4-methyl-6-tert-butylphenol) (Anti-oxidant 2246); p,p'-di-aminodiphenylmethane (Tonox); and styrene phenol reaction products such as "Wingstay L" or "Bostex 294", the latter of which is available from Akron Dispersions, Akron, Ohio. The amounts of the anti-oxidants used are generally in the range of about 0.05 to about 2.0 weight percent on a dry solids basis of the coating or about 0.05 to about 0.5 weight percent of the aqueous composition. The specific amount depends on the specific antioxidant used, but an amount in the stated range would be effective in retarding oxidation or in stabilizing the elastomeric latex in the composition. The preferred antioxidant used is the styrene phenol reaction products, such as "Bostex 294".

In addition, the composition contains a wax to protect the elastomers in the coating compositions from attack by ultra-violet light. Preferably, up to 25 parts by weight on a dry solids basis based on 100 parts of elastomer solids or about 0.1 to about 2 weight percent of the aqueous composition is incorporated into the coating composition. Another advantage of a wax constituent is that it aids in preventing tackiness of the coated glass fiber strands and also aids in improving runability and processility. The amount of wax emulsion is generally about 0.1 to about 2 weight percent of the aqueous composition. The preferred amount of wax is up to 5 parts by weight based on elastomer solids or around 0.8 weight percent of the aqueous composition to obtain the maximum benefits. These waxes generally have a melting point of higher than 50° C. for microcrystalline waxes. The preferred melting point for the microcrystalline waxes is of about 100° C. or more preferably about 135° C. A suitable microcrystalline wax found to be useful in the coating composition of the present invention is that manufactured by Mobile Corporation under the tradename "Mobilcer Q".

The coating composition of the present invention also contains an additive to improve the wet-out of the glass fiber strands. Such agents are glycols; and non-exclusive examples include ethylene glycol, propylene glycol, trimethylene glycol, aglycerol and the like water soluble polyhydroxy alcohols. The preferred glycol used in the coating composition of the present invention is glycerol. The amount of the glycol used in the composition is in the range of about 0.5 to about 1 part per part of the carboxylated elastomeric latex or about 0.05 to about 2 weight percent of the aqueous composition.

The composition also contains amines that function as stabilizing and/or cross-linking agents. The specific amine that is preferred in the composition is triethanolamine. The amount of the amine used in the composition is in the range of about 0.5 to about 1.0 part per part of carboxylated elastomeric latex present in the composition or about 0.05 to about 0.5 weight percent of the aqueous composition. Other amines known by those skilled in the art to be substitutable with triethanolamines in use with elastomeric latex compositions can be used instead of or in addition to the triethanolamine.

Another additive that may be added to the composition is an organic dye to produce coated glass fibers that have a color resembling the yarn pile used in the woven carpet. Non-exclusive examples of organic dyes that can be used in the composition include Calcocid Crocein scarlet, Nigrosine D2P, tartrozine, Auromine, Orange Y-EX and Calcocid Blue 2G. All of these dyes are available from American Cyanamide Corporation. The amount of the dye used in the composition can vary over a wide range to achieve the desired shade of color, but the preferred amount is in the range of about 0.25 to about 0.75 weight percent of the aqueous composition.

In order for the composition to retain its stability, the pH of the composition must be in the range of about 8.7 to about 9.5. Therefore, the coating composition contains a basic pH additive like aqueous ammonia or potassium hydroxide or sodium hydroxide to adjust the pH of the coating composition to be within this range.

The coating composition of the present invention has a solids content in the range of about 10 to about 30 weight percent and when used to coat glass fibers usually gives a coated glass fiber strand having 10 to 20 LOI.

The coating composition of the present invention is applied to sized glass fibers that are produced by attenuating molten streams of a glass composition like "E-glass" or "621-glass" from a bushing in a furnace. The bushing contains numerous holes with tips from which the molten streams of glass can cool while being attenuated to form the glass fibers. Soon after the glass fibers are cooled while being drawn, the glass fibers are contacted with a sizing composition that is used to protect the fibers from interfilament abrasion when the fibers are gathered into a strand and also to make the glass fibers compatible with the matrix to which the glass fibers are added. Sizing compositions usually contain such additives as lubricants, film-formers, coupling agents, wetting agents, textile softening agents, and the like. Any sized glass fiber strand can be coated with the coating composition of the present invention for use in woven carpets. It is preferred to use a sized glass fiber strand that has been sized with only a lubricant and perhaps a film-former. A sized glass fiber strand containing a sizing composition with any other additives would merely be an economic waste since the other additives are not needed in the coated sized glass strand for use in woven carpets. The sized glass fiber strand can be produced by any method known to those skilled in the art.

The sized glass fiber strand that can be twisted or untwisted but preferably twisted is coated with the coating composition of the present invention by any method known to those skilled in the art of coating glass fiber strands. Preferably, the sized glass fiber strands are conveyed through the coating composition contained in a reservoir-type apparatus and then the strands are dried by any convenient means, for example, dielectric heating, or forced air heating to produce the coated glass fiber strands of the present invention.

DESCRIPTION OF PREFERRED EMBODIMENTS

The coating composition is prepared by combining the polybutadiene, carboxylated styrene-butadiene copolymer, octylphenoxypoly (ethyleneoxy) ethanol and styrene phenol reaction product antioxidant with water. Then additional water, microcrystalline wax emulsion, triethanol amine, antifoaming agent, glycerine and aqueous ammonia are added. The preferred amounts of the ingredients are:

| Ingredient | Preferred Range (wt % of total aqueous solution) | Amount |
|---|---|---|
| polybutadiene | 5–15 | 5–7 |
| carboxylated styrene-butadiene copolymer | 15–25 | 15–18 |
| Octylphenoxypoly-(ethyleneoxy) ethanol | 0.25–1 | 0.5 |
| Styrene phenol reaction product anti-oxidant | 0.05–0.3 | 0.1 |
| water | 20–25 | 20–25 |
| water | 25–35 | 25–33 |
| Microcrystalline wax emulsion | 0.5–1 | around 0.8 |
| Antifoaming agent | .01–.05 | .01–.05 |
| triethanolamine | 0.1–0.25 | 0.1–0.15 |
| glycerol | 0.1–0.2 | 0.1–0.15 |
| pH (adjusted with aqueous ammonia) | 8.7–9.5 | 9.2–9.5 |

Glass fibers are formed in a conventional manner and have a sizing composition applied to them during forming. The preferred sizing composition has a conventional lubricant and perhaps a conventional film-former. The sized glass fiber strands are dried and twisted and coated with the above described coating composition.

The coating is performed preferably by conveying the sized glass fiber strands through the coating composition contained in a reservoir type device. The sized glass fiber strands are preferably K-15 1/0 strands but glass fiber strands of any construction can be used. The coated glass fiber strands are dried in a dielectric heater followed by an oven cure in a forced air oven at a temperature in the range of 350°-500° F.

This coated glass fiber strand can be used in any conventional woven carpet or belt drier product.

The coating composition and coated glass fiber strands of the present invention will be further elucidated by reference to the following examples that are presented as non-exclusive representations of the present invention.

to break the coated strand is recorded in pounds (lbs). The results are shown in Table II.

TABLE II

Properties of Coated Glass Fiber Strands

| Example | Tensile (Air) lbs. | Knot Tensile lbs. |
|---|---|---|
| 1 | 50. | 10.1 |
| 2 | 43.8 | 9.4 |
| 3 | 50.4 | 10.4 |

The foregoing has described a coating composition

TABLE I

This table is presented to show several examples of coating compositions used to coat glass fiber strands. The coating composition has the formulation shown in the table and the coated glass fiber strands were tested for their use in woven carpets.

| Material | Example I Solids Wt % | Example I Total Wt % | Example II Solids Wt % | Example II Total Wt % | Example III Solids Wt % | Example III Total Wt % |
|---|---|---|---|---|---|---|
| polybutadiene | 15.9 | 3.6 | 29.6 | 6.7 | 26.5 | 6.6 |
| carboxylated styrene-butadiene copolymer | 75.8 | 17.3 | 65.4 | 16 | 63.2 | 15.7 |
| hydrophilic/lipophilic agent [Octylphenoxy-poly(ethyleneoxy) ethanol] Igepal CA-630 | 2.3 | 0.5 | 1.9 | .5 | 1.9 | .5 |
| Antioxidant (styrene phenol reaction product) (Bostex 294) | 0.5 | 0.1 | 0.5 | 0.1 | 0.5 | 0.1 |
| Water | — | 23.3 | — | 21.5 | — | 21.2 |
| Water | — | 31.2 | — | 28.9 | — | 28.4 |
| Wax emulsion (Mobilcer Q) | 4.0 | .9 | 3.4 | .85 | 6.7 | 1.7 |
| Antifoaming agent (SAG 470) | .16 | .04 | 0.14 | .03 | .13 | .03 |
| Amine (triethanolamine) | 0.6 | .15 | .6 | .1 | .5 | .1 |
| Glycerol | 0.6 | .15 | .6 | .1 | .5 | .1 |
| pH | 9.2 | | 9.3 | | 9.3 | |
| Solids | 18.1 | | 19.9 | | 19.0 | |

The coating compositions presented in Table I were formulated by combining the polybutadiene, carboxylated styrene-butadiene copolymer, hydrophilic/lipophilic agent, and antioxidant with water; and then by adding additional water, wax emulsion, antifoaming agent, amine and glycerine and aqueous ammonia to adjust the pH.

Table II below presents the tensile in air and knot tensile strength of glass fiber strands coated with the three coating compositions of Table I. The elastomeric coating was applied to glass fiber strands where the filaments in the strand had a filament diameter of $5.0 \times 10^{-4}$ (K diameter) with 1000 filaments per strand. The K-15 1/0 glass fiber strands were produced in a conventional process and had a conventional size. The coating was applied in a process similar to coating glass fibers with resorcinol formaldehyde latex coatings as discussed in U.S. Pat. No. 3,619,252 (Roscher). The coated yarn was dried in a dielectric heater followed by an oven cure in a forced air oven from 350°-500° F. This coated glass fiber yarn was then tested according to ASTM test procedure D-2256 for knot tensile strength and tested for tensile in air. The tensile in air test was conducted by placing the coated glass fiber strand in the jaws of an Instron ® test device. The jaws are coated with a polyurethane resin to reduce slipping of the strand during testing. The test device has a gauge length of 25.4 cm. and a cross head speed of 30.5 cm. per minute. The jaws are separated and the force required and coated glass fiber strands having good tensile and knot tensile strength and improved processability to produce coated glass fiber strands that can be used in woven carpets and drier belts. The coating composition has a carboxylated elastomeric latex, an elastomeric plasticizer, and a hydrophilic/lipophilic agent, an antioxidant, wax emulsion, antifoaming agent, amine, polyhydroxylated glycol, and a pH in the range of about 8.7 to about 9.5. The coated glass fiber strand is a sized glass fiber strand coated with the aforementioned coating composition.

I claim:
1. An elastomeric coating composition for glass fibers to produce weaveable coated glass fiber strands with improved processability, having in weight percent on an aqueous basis:
   (a) about 1 to about 15 elastomeric plasticizer,
   (b) about 10 to about 40 carboxylated elastomeric latex,
   (c) about 0.1 to about 2 hydrophilic/lipophilic agent,
   (d) about 0.05 to about 0.5 antioxidant,
   (e) about 0.1 to about 2 wax emulsion,
   (f) about 0.05 to about 0.5 amine,
   (g) about 0.05 to about 2 polyhydroxylated glycol wherein the coating composition has a pH in the range of about 8.7 to about 9.5.
2. The composition of claim 1, wherein the elastomeric latex plasticizer is polybutadiene homopolymer.
3. The coating composition of claim 1, wherein the carboxylated elastomeric latex is carboxylated styrene-butadiene copolymer.

4. The composition of claim 1, wherein the hydrophilic/lipophilic agent is a phenoxypoly(ethyleneoxy)ethanol.

5. The composition of claim 1, wherein the antioxidant is a styrene phenol reaction product.

6. The composition of claim 1, wherein the wax emulsion is a microcrystalline wax.

7. The composition of claim 1, wherein the amine is triethanolamine.

8. The composition of claim 1, wherein the polyhydroxylated glycol is glycerol.

9. The composition of claim 1 having aqueous ammonia to adjust the pH within the range of about 8.7 to about 9.5.

10. Coated glass fiber strand having the coating composition of claim 1.

11. The composition of claim 1 wherein the carboxylated elastomeric latex is replaced in an amount of up to one-half the amount present by a non-carboxylated elastomeric latex.

12. The composition of claim 1 having present an organic dye in an amount in the range of about 0.25 to about 0.75.

13. Glass fibers coated with the composition of claim 1.

14. A coated, sized, glass fiber strand produced in a facile operation and having good weaveability having a coating comprised of the dried residue of a composition, comprising in weight percent on an aqueous basis:
(a) about 5 to about 15 of polybutadiene,
(b) about 10 to about 40 of carboxylated styrene butadiene copolymer latex,
(c) about 0.25 to about 1 octylphenoxypoly(ethyleneoxy) ethanol,
(d) about 0.05 to about 0.3 styrene phenol reaction product antioxidant,
(e) about 0.5 to about 1 microcrystalline wax emulsion,
(f) about 0.1 to about 0.25 triethanolamine,
(g) about 0.1 to about 0.2 glycerol wherein the composition is adjusted to a pH of 8.7 to about 9.5 with aqueous ammonia.

15. Woven carpet wherein the weft yarn is composed of the coated glass fiber strands of claim 13 or claim 14.

16. Drier belt for use in conveying wet material through a drier wherein the weft and warp yarn are composed of coated glass fiber strands of claim 13 or claim 14.

* * * * *